Oct. 6, 1936. S. N. BUCHANAN 2,056,248
WIRE CONNECTER
Filed Sept. 8, 1933
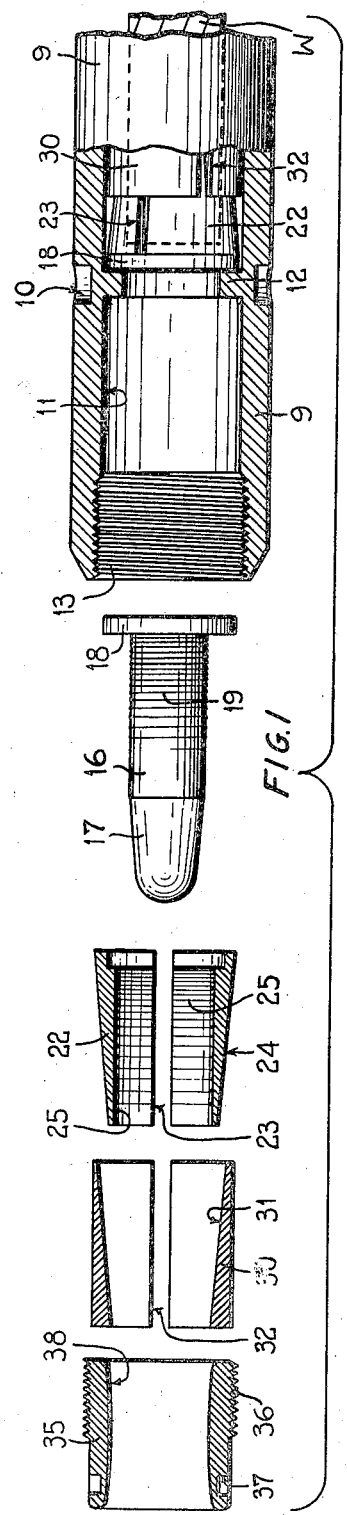
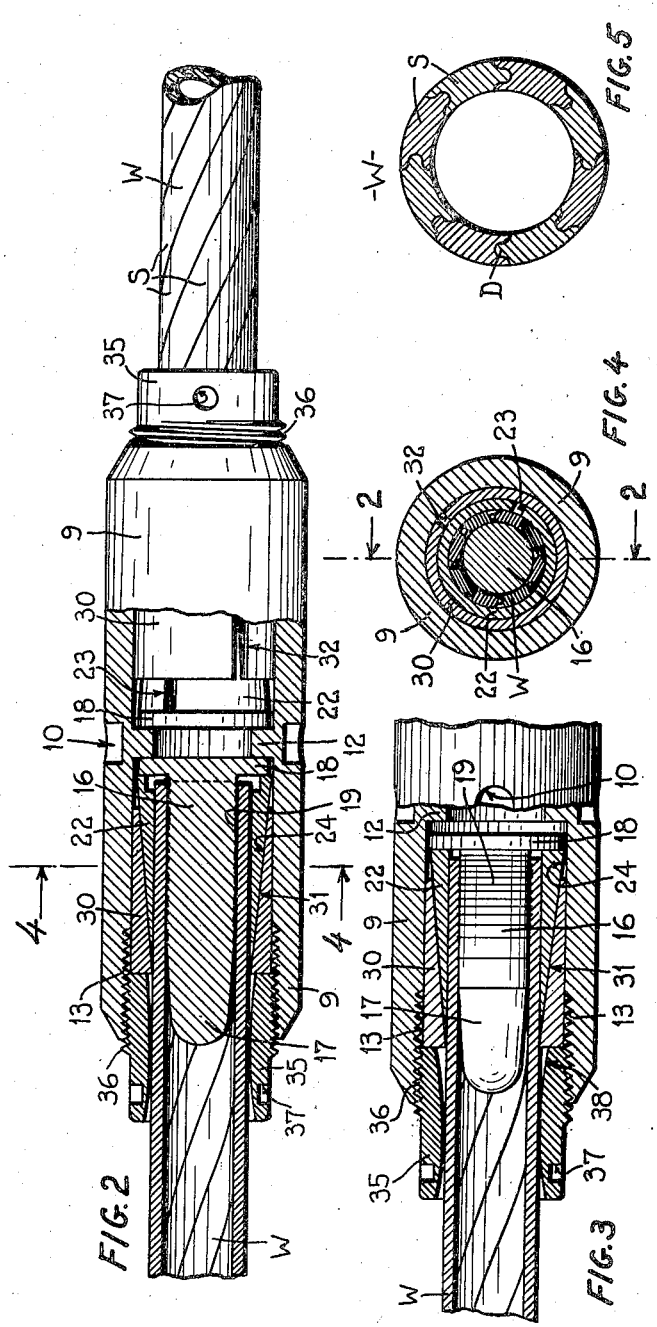
INVENTOR
STEPHEN N. BUCHANAN
BY
Bohleber & Ledbetter
ATTORNEYS Patented Oct. 6, 1936

2,056,248

UNITED STATES PATENT OFFICE 2,056,248

WIRE CONNECTER

Stephen N. Buchanan, Elizabeth, N. J., assignor to The Thomas & Betts Co., Elizabeth, N. J., a corporation of New Jersey Application September 8, 1933, Serial No. 688,560

28 Claims. (Cl. 173—303)

This invention relates to an electrical wire connecter for use in installing high voltage electrical transmission lines, and more particularly to a heavy duty hollow wire connecter adapted to join together the ends of two hollow wires or cables, or to attach the end of the hollow wire to some other structure such as a building or other support.

One type of hollow wire for high voltage electrical transmission now in use is built up of spirally wound ribbons or strips of copper or other metal with dovetailed interlocking edges to form a tubular conductor. Such a built up wire is liable to collapse if the connecter device clamping the end of the hollow wire is not properly constructed. A satisfactory wire connecter must firmly grip the end of a single wire or positively connect together the ends of two wires without injuring or weakening the wire end or ends and must also make and maintain positive electrical connection.

It is an object of this invention to construct a new and novel hollow wire connecter which firmly grips the end of a wire by a new mode of action and having self-adjusting characteristics to continuously retighten and compensate for any looseness in the gripping power and in the electrical contact which otherwise would occur due to variations in temperature, resulting in a possible change in size of parts, especially so if constructed of metals having different coefficients of expansion, and also resulting in increase of stress or load on the wire incident to climatic conditions.

Another object of the invention is to construct a wire connecter capable of the above mentioned compensating self-tightening action and utilizing wire gripping, clamping or anchorage sleeves having cooperating conical surfaces so that one sleeve is contracted and clamped within the other and about the wire and a cooperating anchorage plug disposed in the extremity of the hollow wire. This object is attained by providing an inner sleeve which is contractible to grip the outer wire surface and likewise force the inner wire surface to grip the plug upon forcible axial movement of the outer sleeve when the parts are initially assembled and the wire is attached and electrically joined to the connecter. Thereafter the inner gripping sleeve and the plug are self-adjusting to compensate and take up for any variation in size of the wire or the connecter parts caused by temperature variations and long use. Weather conditions, such as a drop in temperature, may increase the stress or tension on the connecter due to a shortening or contraction of a long section of the wire pulling on the connecter, or due to ice forming on the wire, or to wind pressure, and my invention takes advantage of these forces to retighten the connecter device by urging the self-adjusting clamping plug and inner sleeve relatively within the outer stationary sleeve and tubular connecter body. This mode of operation automatically enforces a contraction of said inner sleeve and results in maintaining the gripping action of the connecter device on and around the hollow wire, doing so long after the parts are assembled and without further attention of a mechanic, and doing so at the inception of any tendency to cause looseness, thereby preventing looseness from ever coming to pass.

Other objects of the invention will be more apparent from the following description taken in connection with the accompanying drawing which illustrates an example of the invention, wherein:

Figure 1 is an exploded view of one end of the wire connecter adapted to join and electrically connect the ends of two hollow wires, the connecter parts being withdrawn from the connecter body and separated in their order of assembly.

Figure 2 is a partial longitudinal section through the wire connecter showing the parts thereof in initial assembled position gripping a wire. This view is taken along the line 2—2 of Figure 4 and shows the initial position of the parts before attaining the finally anchored and self-adjusted, compensated, or retightened position, as in Figure 3.

Figure 3 is a partial longitudinal section of the wire connecter some time after its installation and showing in somewhat exaggerated manner the new position of parts in self or retightened position and brought about, for example, by long use and climatic conditions.

Figure 4 is a cross section on the line 4—4 of Figure 2.

Figure 5 is a cross section of one form of hollow wire for which the connecter is produced, showing the interlocking or dovetailed edges of the conductor ribbons forming the built up wire strand used in high voltage current transmission.

A hollow electrical conductor or wire W, which is adapted to be secured by the connecter described herein, is shown in cross section in Figure 5 and consists of a plurality of spiral metallic ribbons or strips S having tongue and groove dovetail joints D along the abutting winding edges thereof which interlock the adjacent strips together. These spiral strips form a cylindrical conductor of substantial diameter for high voltage electrical transmission. The outside diameter of one type of hollow conductor now in use exceeds somewhat an inch and larger sizes are contemplated. The wire W is frequently suspended over great distances, i. e., carried between steel towers spaced far apart. This means that the suspended wire is sometimes several thousand pounds in weight, may be under great wind pressure, may accumulate a large load of ice in the winter, and consequently exerts a great pull on the connecters which are joined to the wire ends.

This wire connecter has a body 9 in the form of a tubular member with a longitudinal bore 11. A spanner wrench socket 10 or other means may be made in or on the body 9 for holding the wrench when assembling and tightening the internal parts. Preferably a dividing shoulder 12 is disposed intermediate the ends of the tubular body 9 to form a stop which assures that the connecter parts are fully inserted within the tubllar body before the wire W is clamped therein. Screw threads 13 are formed at each end of the bore 11 of the connecter body 9.

An anchorage plug or plug means 16, having an outside diameter substantially the same as that of the inside diameter of the hollow wire W, is adapted to be inserted and gripped in the end of said wire and carried thereby. This plug or plug means 16 has a slightly tapered forward cylindrical portion 17 and a rounded end to assist in centering it when inserting the plug into the hollow wire. More particularly, the reduced tapered plug portion 17 permits free movement or swinging vibration of the hollow wire in the wind without the wire being held rigid and kinked by the plug extremity. In other words, the internal surface of the wire W hangs clear and free of the plug extremity 17 to afford an easy elastic and saddle-like riding motion of the cable in relation to the connecter device. This construction permits the cable to assume an axial arc, rather than a sharp angle at the connecter end, which is desirable since a wire is more liable to crack and break under the latter condition.

The other or rear end of the plug means 16 is provided with a flange or similar projecting means 18, one face of which initially abuts against the central shoulder 12, and the other face of this flange 18 engages or bears and rides against a radial shoulder formed by the inner or thick larger end of an externally tapered and split contractile self-adjusting and clamping sleeve 22, which shoulder is spaced from the thin narrow end of said sleeve. The plug 16 is also preferably provided with gripping corrugations, biting ridges or rings 19 which begin at the flange or headed means 18 and graduate or taper down to nothing on the plug surface at a point spaced from its tapered end 17. In other words, the series of biting rings 19 have a maximum biting tooth depth on the plug 19 at its shoulder 18 and gradually smooth or fade out at or before the taper 17 so that the wire W is not abraded or indented by the free rocking motion of said wire over the tapered plug end 17 adjacent the end of the connecter.

The inner contractile self-adjusting sleeve 22 has a longitudinal slot 23 extending therethrough which renders the sleeve elastic diametrically, i. e., contractible and expandible. Its outer slide surface 24 is tapered or conical preferably for the length of the sleeve and decreases outwardly in diameter from its inner thick end which is adjacent the plug projecting flange 18 or adjacent the end of the wire W. Hence the sleeve 22 has an external minimum diameter at its smaller or outer narrow end which is adjacent the extremity of the tubular connecter body 9 or spaced from the end of the wire W to provide for retightening thereof, as will appear more fully hereinafter. The inner surface or bore of the sleeve 22 has gripping corrugations or biting rings 25 adapted to embed in the external surface of the wire W to secure a greater clamping grip thereon. The gripping corrugations 25, as on the plug 16, are larger at the thick end of the sleeve 22 and taper off to a smooth surface at or before reaching the other end of the sleeve.

The gripping rings or ridges 19 on the plug 16 and rings 25 in sleeve 22 might have a tendency to weaken the wire unless provided against as in my invention, but since these graduated ridges are larger and bite deeper at the extreme inner end of both the plug 16 and contractile sleeve 22, where the strain, caused by the pull of the wire W, is a minimum, it follows that there is no such tendency to weaken the wire because the coacting biting ring means 19, 25 fade out before reaching the tapered end 17 of said plug. In other words, the ridges 19 and 25 more effectively or powerfully grip the wire W at its inner end near the plug head 18 where such grip is not likely to cause failure of the wire because its tensile strain is at a minimum at the inner end of the plug 16.

An outer connecter sleeve 30 has an internal conical smooth slide surface 31 tapering in the same direction as the external smooth slide taper 24 of sleeve 22 and both tapers cooperate to effect the wire clamping function. The sleeve 30 is slipped over the contractible inner connecter sleeve 22 so that the conical surfaces 24 and 31 slidably engage each other. This outer sleeve 30 may also be provided with a slot 32 extending longitudinally therethrough which also renders it expansible and contractible similar to the inner connecter sleeve 22. Sleeve 30 has preferably an external cylindrical surface and hence a normal external sliding fit within the bore 11 of the tubular connecter body 9 so that normally the split 32 is open to permit expansion or contraction of this sleeve.

An initial operating means, such as the nut 35 at each end of the device, has external screw threads 36 which engage the internal threads 13 within each end of the connecter body 10. Spanner wrench holes 37 are formed in the operating nut 35, or any other wrench holding means may be provided. The nut 35 has an internal bore 38 formed with a double taper which permits the hollow wire to vibrate or swing from the connecter without pinching or buckling when swaying in the wind. The bore 38 curves through the nut 35 on a radius, the center of which is located outside thereof and transverse to the axis of said nut, so that the hollow wire tangentially bears lightly against the central portion of said bore, thus avoiding binding the wire, and permitting it to rock in the nut by an easy saddling motion to avoid kinking the wire.

The connecter body 9 and the sleeve 30 together form connecter means having an internal conical surface. In the specific form of the invention disclosed herein, in which two sleeves 22 and 30 are utilized, the sleeve 30 serves two functions, namely, it provides the internal conical surface 31 which cooperates with the external conical surface 24 upon the contractile sleeve 22, and it serves as a part of the operating means or as an operating connection for the nut 35 with the inner contractile sleeve 22 to contract the latter.

The invention contemplates any operating means which is carried by any part of the whole connecter device and has axial movement therewith. Such operating means must have an operative connection with the contractile means whereby relative axial movement is obtained or set up between the contractile sleeve 22 and the internal conical surface 31. It should also be noted that the contractile sleeve has its narrow or smaller diameter end space from the end of the wire and adjacent the end of the connecter body 9 so that the contractile sleeve 22 is urged outwardly by the plug means 16, 18 and the pull of the hollow wire W to retighten the connecter device in case a loosening of the parts tends to occur after tightening the nut 35.

The connecter means, which comprises the body 9 and the outer sleeve 30 with its internal conical surface 31, and the contractile sleeve 22 form cooperating clamping means for gripping the wire W. In order to provide for retightening of the contractile sleeve 22 by the pull on the wire, this sleeve is placed upon the wire so that it has its smaller end spaced from the wire end and its larger end adjacent the wire end. The operating means or nut 35 may be carried by any other element or part of the connecter device and is axially movable on the part on which it is carried. The operating means also is operatively connected with one of the parts or elements forming the cooperating clamping means in order to set up relative movement between the contractile sleeve 22 and the internal conical surface 31 of the connecter means to initially contract the sleeve 22. In the preferred construction shown herein, the operating nut 35 moves the outer sleeve 30 with its internal conical surface 31 relatively to the contractile sleeve 22 to initially contract the latter and grip the wire W.

The outer sleeve 30 with the operating nut 35 form initial operating means having an internal conical surface 31 which engages the external conical surface 24 of the contractile sleeve 22. This initial operating means has means, such as the screw threads 13 and 36, to axially move the same relatively to the contractile sleeve to contract the latter and thereby grip the wire W.

The wire W and this connecter are assembled by first inserting the operating nut 35 over the end of the wire so that the threaded nut portion 36 faces toward the end of the wire. The connecter sleeve 30 is next placed over the end of the wire, followed by the smaller contractible sleeve 22. The self-tightening or adjusting plug or plug means 16 is next inserted into the end of the wire W with the shoulder 18 preferably spaced from the end of the wire, as shown. The contractible sleeve 22 has its inner thick end placed beyond the end of the wire and abutting the flange 18 of the plug 16. The wire with the nut 35, the telescoped sleeves 22 and 30, and the plug 16, are now inserted into the tubular body 9 until the headed or flanged end 18 of the plug seats against the shoulder 12. The operating nut 35 is then screwed into the threads 13 of the body 9, whereupon the outer sleeve 30 is forced axially or slides relatively along the inner sleeve 22.

The axial movement of the outer sleeve 30 forcibly brings the coacting conical surfaces 24 and 31 of the sleeves into sliding engagement with each other to contract the inner sleeve 22 which causes the biting rings or teeth 19 on the plug 16 and rings 25 in the sleeve 22 to sink or squeeze into the copper hollow wire W, inside and outside thereof, thus positively anchoring said wire in the connecter body 9 behind the nut 35.

The wire connecter described herein shows an initial tightening means being carried by and forming a part of the wire connecter. The invention, however, may be considered and viewed entirely from its particular construction for maintaining a grip on the wire within the connecter body 9 in case there should develop a tendency to loosen. Such clamping and grip-maintaining means compensates for unloosening in its inception, hence looseness never occurs, and this is an important feature and part of the invention regardless of what structural form the initial tightening means may assume.

In a wire connecter construction where the outer sleeve 30 is slotted, as here shown, this sleeve expands against the surface of the rigid body bore 11 to set or stop the sleeve 30 against further expansion when the nut 35 is finally tightened or when the great weight of the wire W drags the self-tightening plug 16 and sleeve 22 away from the shoulder 12, as in Figure 3, and urges the sleeve 22 toward the nut 35. Hence the split 32 permits the sleeve 30 to open and attain its final reinforced support against the wall 11 of the connecter body 9 to resist further expansion thereof to force the tapered sleeve 22 to contract and bite its teeth 25 into the external surface of the wire and to contract the internal surface of the wire around the plug and force said wire to become embedded on the plug ridges 19. Obviously, any means for forcing the nut 35 axially inwardly of the tubular connecter body 9 and propelling the sleeve 30 axially with respect to the contractible sleeve 22, is contemplated in this invention.

It is to be noted that the external surface of the wire W is bushed and protected by the double ended internal taper 38 of the nut 35, while the inside surface of the wire is similarly protected by the easy taper of the plug portion 17. Hence the wire, inside and outside, has adequate clearance between it and the connecter parts 17 and 35 where the wire enters said device connecter. This feature permits of a limited relative easy motion between the wire and connecter to avoid possible external or internal cracking or bending strain which might lead to rupture of the heavy wire cable W. In other words, the hollow wire W has a rocking clearance between the plug end 17 and the nut 35 which distributes, rather than concentrates, the bending strain of the wire W swaying in the air between its suspended points.

The wire connecter device described herein has two clamping mechanisms, one at each extremity, and each of which is adapted to grip the end of a wire W. It is clear that one of these wire clamping means may be substituted for some other anchoring device or construction, as desired, whereby the end of the wire may be anchored to a building or other structure. Again the connecter herein may be used without the plug 16 in case the wire W is not a hollow wire.

A feature of importance in my invention is the powerful force continuously exerted on the hollow wire W by the opposed biting ring teeth 19 and 25 inside and outside the hollow wire to follow up any possible looseness which may tend to develop in the assembled parts long after the wire is initially connected and the installation is final where there can be no more manual tightening of the nut or nuts 35 at the ends of the connecter body 9. I employ the weight of the wire W to effect this self-retightening operation, as will be explained.

A long suspended strand of this high tension wire W exerts a great pull on the plug 16, sometimes several thousand pounds. A substantial drop in temperature may increase the pull due to longitudinal contraction of the wire and cause the plug 16 to be urged or pulled with the wire relatively to and within the body 9. The weight and pull of the wire is also increased by wind pressure or ice accumulated thereon. Likewise there may occur a variation of a few thousandths of an inch in the diameter of the hollow wire, as well as in the parts of the connecter device, especially so if the coefficient of expansion is different in respect to the wire and the several parts of the connecter. Also long use is a factor which may wear and loosen the parts unless provided against. Hence a variety of conditions may tend to cause a looseness to develop between the external surface of the wire W and the internal biting ringed surface 25 of the sleeve 22, as well as between the biting teeth 19 of the plug 16 and the inside of the wire W, due to the causes named, but which looseness never occurs as will now be explained.

As the above conditions take place, and in their inception, the plug means 16 and its flange 18, which is anchored and carried in the hollow wire, creeps outwardly from the shoulder 12 by the great weight and pull of the wire W, as in Figure 3, and urges the sleeve 22 ahead of it. This action enforces compensation for change or decrease in size of the parts or increased weight of the wire and automatically tightens and maintains a positive grip upon the wire due to the fact that the stationary sleeve 30, held by nut 35, enforces a contraction of the inner sleeve 22 as the latter tends to creep toward the nut 35. Hence the plug means 16, 18 moving freely with the wire W, and its cooperating sleeve 22, comprise a retightening or self-adjusting means, movable outwardly in relation to the connecter body 9, to always maintain a continuously applied tightening and gripping force between the wire W and its connecter body 9. The result is that looseness never occurs between the wire W and gripping teeth 19 and 25 because retightening occurs simultaneously with any tendency to loosen.

It is apparent therefore that I have provided a heavy duty wire connecter having an initial or primary operating means 35, 30 to effect the initial assembly and installation, together with a secondary and continuously active operating means in the plug 16 with its headed flange 18 and sleeve 22 for retightening and compensating for latent wear or looseness in parts, whatever may be the cause thereof, no matter how long subsequent to the initial installation this condition may occur.

Various modifications usually occur to those skilled in the art after observing the teachings of the invention. However, no limitation is intended by the foregoing description or illustration in the accompanying drawing. A comparison of my construction and its mode of operation to other wire connecters will more clearly render manifest the features constituting my invention. In connection with the claims which define the invention as comprising enumerated elements, it is to be understood that the claims are not restricted to the enumerated elements but simply indicate that certain elements or their equivalents are called for by the claims.

What is claimed is:

1. A heavy duty wire connecter for hollow wire comprising, a body member having a bore therein, a cylindrical plug insertable within the wire and freely movable therewith, a contractile sleeve adapted to fit over the wire and grip the same when contracted and having an exterior conical surface, a radial shoulder carried by the contractile sleeve, means carried by the plug abutting against the radial shoulder carried by the contractile sleeve to move the latter to tighten the connecter, a second sleeve having an internal conical surface which telescopes and engages the exterior conical surface of the first sleeve, the second sleeve being received in the bore of the body member, and operating means carried by the body member and movable axially thereon, said operating means engaging the second sleeve to force the latter axially in the bore and contract the first sleeve to initially clamp the wire between the first sleeve and the plug.

2. A wire connecter for hollow wire comprising a body having a bore therein, a plug means adapted to be inserted within the wire end and freely movable therewith, a flange on the plug means, a contractile sleeve adapted to fit over the wire and grip the same when contracted, the contractile sleeve having a radial shoulder at its large end abutting the flange on the plug means, the sleeve having an exterior conical surface, a second sleeve having an internal conical surface engaging the exterior conical surface of the first sleeve, the second sleeve being received in the bore of the body, and operating means carried by the body and movable axially thereon, said operating means engaging the second sleeve to force the latter into the bore and contract the first sleeve to clamp the wire between the first sleeve and the plug means.

3. A wire connecter for hollow wire comprising, a body having a bore therein, a plug adapted to be inserted within the wire and freely movable therewith, a projecting means carried by the plug, a contractile sleeve adapted to fit over the wire and grip the same when contracted, the contractile sleeve having a radial shoulder at its large end abutting the projecting means on the plug, the sleeve having an exterior conical surface, a second and expansible sleeve having an internal conical surface engaging the exterior conical surface of the first sleeve, the second sleeve being received in the bore of the body, and operating means carried by the body and movable axially thereon, said operating means engaging the second sleeve to force the latter into the bore thereby contracting the first sleeve to clamp the wire between the first sleeve and the plug and expanding the second sleeve to grip the body.

4. A wire connecter for hollow wire comprising, a body having a bore therein, a plug means adapted to be inserted within the wire end and freely movable therewith, a flange on the plug means, a contractile sleeve adapted to fit over the wire and grip the same when contracted, the contractile sleeve having a radial shoulder at its large end abutting the flange on the plug, the sleeve having an exterior conical surface, a second and expansible sleeve having an internal conical surface engaging the exterior conical surface of the first sleeve, the second sleeve being received in the bore of the body, and operating means carried by the body and movable axially thereon, said operating means engaging the second sleeve to force the latter into the bore thereby contracting the first sleeve to clamp the wire between the first sleeve and the plug and expanding the second sleeve to grip the body.

5. A wire connecter for hollow wire comprising, a body having a cylindrical bore therein, a contractile sleeve adapted to fit over the wire, the sleeve having an exterior conical surface, a second sleeve having an internal conical surface engaging the exterior conical surface of the first sleeve, the second sleeve being received in the cylindrical bore of the body, initial operating means carried by the body and movable axially in relation thereto, said initial operating means engaging the second sleeve to force the latter further into the bore thereby contracting the first sleeve to clamp the wire, and a second operating means movable with the wire and cooperating with the wire and the first sleeve to subsequently retighten the connecter by the pull of the wire in case the connecter should become loosened.

6. A wire connecter for hollow wire comprising, a body having a bore therein, a contractile sleeve adapted to fit over the wire, the sleeve having an exterior conical surface, a second and expansible sleeve having an internal conical surface engaging the exterior conical surface of the first sleeve, the second sleeve being received in the bore of the body, initial operating means carried by the body and movable axially thereon, said initial operating means engaging the second sleeve to initially force the latter into the bore thereby contracting the first sleeve to clamp the wire and expanding the second sleeve to grip the body, and a second operating means movable with the wire and engaging the first sleeve to subsequently retighten the connecter by the pull of the wire in case the connecter should become loosened.

7. A wire connecter for hollow wire comprising, a body having a bore therein, a plug adapted to be inserted within the wire end and movable therewith, a taper on the end of the plug, conical clamping means adapted to fit over the wire and grip the same and movable therewith to retighten the clamping means, operating means carried by the body and movable axially thereon, said operating means engaging the clamping means to contract the same to clamp the wire within the connecter, and a double arcuate taper within the operating means with its smaller diameter between the ends thereof to permit easy wire motion at the end of the connecter without abrading the wire.

8. A wire connecter for hollow wire comprising, a body having a bore therein, a plug insertable within the wire and freely movable therewith, a radially extending flange on the plug, a contractile sleeve adapted to fit over the wire and grip the same and abutting the flange on the plug to move the contractile sleeve with the wire and plug and retighten the grip of the sleeve on the wire, the sleeve having an exterior conical surface, a second sleeve having an internal conical surface engaging the exterior conical surface of the first sleeve, the second sleeve being received in the bore of the body, operating means carried by the body and movable axially thereon, said operating means engaging the second sleeve to force the latter into the bore thereby contracting the first sleeve to clamp the wire, and an arcuate taper within the operating means to permit easy wire motion at the end of the connecter without abrading the wire.

9. A wire connecter for connecting together the ends of two hollow wires comprising, a body having a bore therein, a shoulder centrally of the ends of the body and within the bore, a plug for each wire end adapted to be inserted within the hollow wire and movable with its respective wire, a flange at one end of each plug adapted to abut against the shoulder, conical clamping means within each end of the body and engaging a wire end to clamp each wire within the body, the conical clamping means being movable with its respective wire to retighten the grip on the wire, and operating means upon each end of the body and operating the clamping means to secure the ends of both wires within the connecter.

10. A wire connecter device for hollow wire comprising; cooperating clamping means including, connecter means having an internal conical surface, and a contractile sleeve adapted to fit over the wire and having an exterior conical surface engaging the internal conical surface of the connecter means, the contractile sleeve having its smaller end spaced from the end of the wire and its larger end adjacent the end of the wire to provide for retightening thereof, plug means insertable within the wire and freely movable therewith and with the contractile sleeve to assist in retightening of the latter, and operating means carried by one of the aforesaid elements and movable axially thereon, said operating means being operatively connected with one of the elements of the cooperating clamping means to set up relative movement between the contractile sleeve and the internal conical surface of the connecter means to initially contract the contractile sleeve and grip the wire between the contractile sleeve and the plug means.

11. A wire connecter device for hollow wire comprising; cooperating clamping means including, connecter means having an internal conical surface, and a contractile sleeve adapted to fit over the wire and having an exterior conical surface engaging the internal conical surface of the connecter means, the contractile sleeve having its smaller end spaced from the end of the wire and its larger end adjacent the end of the wire to provide for retightening thereof; initial operating means carried by one of the parts of the clamping means and movable axially thereon, said operating means being operatively connected with one of the elements of the cooperating clamping means to set up relative movement between the contractile sleeve and the internal conical surface of the connecter means to initially contract the contractile sleeve and grip the wire, and a second operating means freely movable with the wire and cooperating with the wire and the contractile sleeve to subsequently retighten the latter by the pull of the wire in case the connecter should become loosened.

12. A wire connecter device for hollow wire comprising; cooperating clamping means including, connecter means having an internal conical surface, and a contractile sleeve adapted to fit over the wire and having an exterior conical surface engaging the internal conical surface of the connecter means, the contractile sleeve having its smaller end spaced from the end of the wire and its larger end adjacent the end of the wire to provide for retightening thereof; a radial shoulder on the contractile sleeve spaced from its smaller end, plug means insertable within the wire and freely movable therewith and with the contractile sleeve to assist in retightening of the latter, means carried by the plug means and engaging the radial shoulder to move the contractile sleeve with the plug means and wire, and operating means carried by one of the aforesaid elements and movable axially thereon, said operating means being operatively connected with one of the elements of the cooperating clamping means to set up relative movement between the contractile sleeve and the internal conical surface of the connecter means to initially contract the contractile sleeve and grip the wire between the contractile sleeve and the plug means.

13. A wire connecter device for hollow wire comprising; cooperating clamping means including, connecter means having an internal conical surface, and a contractile sleeve adapted to fit over the wire and having an exterior conical surface engaging the internal conical surface of the connecter means, the contractile sleeve having its smaller end spaced from the end of the wire and its larger end adjacent the end of the wire to provide for retightening thereof; operating means carried by one of the aforesaid elements and movable axially thereon, said operating means being operatively connected with one of the elements of the cooperating clamping means to set up relative movement between the contractile sleeve and the internal conical surface of the connecter means to initially contract the contractile sleeve and grip the wire, a radial shoulder on the contractile sleeve spaced from its smaller end, and a second operating means freely movable with the wire and having operative connection with the radial shoulder to subsequently assist in retightening of the contractile sleeve by the pull of the wire in case the connecter should become loosened.

14. A wire connecter device for hollow wire comprising; cooperating clamping means including, connecter means having an internal conical surface, and a contractile sleeve adapted to fit over the wire and having an exterior conical surface engaging the internal conical surface of the connecter means, the contractile sleeve having its smaller end spaced from the end of the wire and its larger end adjacent the end of the wire to provide for retightening thereof; a radial shoulder carried by the contractile sleeve spaced from the smaller end of the latter; plug means insertable within the wire and freely movable therewith and with the contractile sleeve to assist in retightening of the latter including, a radially extending flange carried by the plug means and engaging the radial shoulder; and operating means carried by one of the aforesaid elements and movable axially thereon, said operating means being operatively connected with one of the elements of the cooperating clamping means to set up relative movement between the contractile sleeve and the internal conical surface of the connecter means to initially contract the contractile sleeve and grip the wire between the contractile sleeve and the plug means.

15. A wire connecter device for hollow wire comprising; cooperating clamping means including, connecter means having an internal conical surface, and a contractile sleeve adapted to fit over the wire and having an exterior conical surface engaging the internal conical surface of the connecter means, the contractile sleeve having its smaller end spaced from the end of the wire and its larger end adjacent the end of the wire to provide for retightening thereof; a radial shoulder formed by the larger end of the contractile sleeve; plug means insertable within the wire and freely movable therewith and with the contractile sleeve to assist in retightening of the latter including, means carried by the plug means and engaging the radial shoulder; and operating means carried by one of the aforesaid elements and movable axially thereon, said operating means being operatively connected with one of the elements of the cooperating clamping means to set up relative movement between the contractile sleeve and the internal conical surface of the connecter means to initially contract the contractile sleeve and grip the wire between the contractile sleeve and the plug means.

16. A wire connecter device for hollow wire comprising; cooperating clamping means including, connecter means having an internal conical surface, and a contractile sleeve adapted to fit over the wire and having an exterior conical surface engaging the internal conical surface of the connecter means, the contractile sleeve having its smaller end spaced from the end of the wire and its larger end adjacent the end of the wire to provide for retightening thereof; a radial shoulder formed by the larger end of the contractile sleeve; plug means insertable within the wire and freely movable therewith and with the contractile sleeve to assist in retightening of the latter including, a radially extending flange carried by the plug means and engaging the radial shoulder; and operating means carried by one of the aforesaid elements and movable axially thereon, said operating means being operatively connected with one of the elements of the cooperating clamping means to set up relative movement between the contractile sleeve and the internal conical surface of the connecter means to initially contract the contractile sleeve and grip the wire between the contractile sleeve and the plug means.

17. A wire connecter device for hollow wire comprising, a body, a contractile sleeve adapted to fit over the wire and having an exterior conical surface, the contractile sleeve having the smaller end of its conical surface spaced from the wire end and the larger end of the conical surface adjacent the wire end to provide for retightening of the contractile sleeve; initial operating means carried by the body and having, an internal conical surface engaging the external conical surface of the contractile sleeve, and means to axially move the initial operating means relatively to the contractile sleeve to contract the latter and grip the wire; plug means insertable within the wire and anchored thereto and freely movable therewith, and means carried by said plug means and the contractile sleeve and cooperating together to form a unitary retightening structure between the plug, the wire and the contractile sleeve which cooperate together under the pull of the wire to subsequently retighten the contractile sleeve in case it should become loosened.

18. A wire connecter device for hollow wire comprising, a body, a contractile sleeve adapted to fit over the wire and having an exterior conical surface, the contractile sleeve having the smaller end of its conical surface spaced from the wire end and the larger end of the conical surface adjacent the wire end to provide for retightening of the contractile sleeve, a radial shoulder on the contractile sleeve spaced from the smaller end thereof; initial operating means carried by the body and having, an internal conical surface engaging the external conical surface of the contractile sleeve, and means to axially move the initial operating means relatively to the contractile sleeve to contract the latter and grip the wire; and plug means insertable within the wire and freely movable therewith including means carried thereby and engaging the radial shoulder to assist in retightening the contractile sleeve by the pull of the wire in case the connecter should become loosened.

19. A wire connecter device for hollow wire comprising, a body, a contractile sleeve adapted to fit over the wire and having an exterior conical surface, the contractile sleeve having the smaller end of its conical surface spaced from the wire end and the larger end of the conical surface adjacent the wire end to provide for retightening of the contractile sleeve, a radial shoulder formed by the larger end of the contractile sleeve; initial operating means carried by the body and having, an internal conical surface engaging the external conical surface of the contractile sleeve, and means to axially move the initial operating means relatively to the contractile sleeve to contract the latter and grip the wire; and plug means insertable within the wire and freely movable therewith including a flange engaging the radial shoulder to assist in retightening the contractile sleeve by the pull of the wire in case the connecter should become loosened.

20. A heavy duty wire connecter for hollow wire comprising, a body member having a bore therein, a cylindrical plug insertable within the wire and freely movable therewith, a contractile sleeve adapted to fit over the wire and grip the same when contracted and having an exterior conical surface, the contractile sleeve having its smaller end spaced from the end of the wire and the larger end adjacent the end of the wire, a second sleeve having an internal conical surface which engages the exterior conical surface of the first sleeve, the second sleeve contacting with the cylindrical bore of the body member, means carried by the plug and the contractile sleeve which cooperate together so that the contractile sleeve moves with the plug and wire relatively to the internal conical surface on the second sleeve, to retighten the connecter device, and operating means carried by the body member and movable axially with respect thereto, said operating means engaging the second sleeve to force the latter axially in the bore and contract the first sleeve to clamp the wire between the first sleeve and the plug whereby the wire, plug and contractile sleeve are clamped together as a unit so that these parts move together to retighten the connecter under the pull of the wire in case the connecter should become loosened.

21. A wire connecter for hollow wire comprising, a body having a cylindrical bore therein, a contractile sleeve adapted to fit over the wire end, the sleeve having an exterior conical surface with its smaller diameter thereof spaced from the end of the wire and its larger diameter adjacent the end of the wire, a plug adapted to be inserted within the wire end and cooperating with the contractile sleeve to retighten the connecter by the pull of the wire after its initial tightening, the plug being independent of the other parts of the connecter so that the plug is freely movable with the wire, biting ridges upon the wire engaging surface of at least one of said aforesaid parts and increasing in size towards the end of the wire, a second sleeve having an internal conical surface engaging the exterior conical surface of the first sleeve, the second sleeve contacting with the cylindrical bore of the body and the end of said second sleeve having the thicker wall thereof disposed adjacent the end of the body, and operating means carried by the body and movable axially thereinto, said operating means engaging the outer end of the second sleeve to force the latter into the bore and initially contract the first sleeve around the wire to clamp the wire, plug and said contractile sleeve together as a unit whereby these parts move together to retighten the connecter under the pull of the wire upon subsequent unloosening thereof.

22. A wire connecter device for hollow wire comprising connecter means having an internal conical surface, the internal conical surface having its smaller diameter spaced from the end of the wire, a contractile sleeve adapted to fit over the wire and having an exterior conical surface engaging the internal conical surface of the connecter means, the contractile sleeve having its smaller end spaced from the end of the wire and its larger end adjacent the end of the wire to provide for retightening thereof, means to initially contract the contractile sleeve to grip the wire by enforcing relative movement between the contractile sleeve and the internal conical surface; a radial shoulder on the contractile sleeve spaced from its smaller end, a retightening operating means freely movable with the wire and having operative connection with the radial shoulder to subsequently assist in retightening of the contractile sleeve by the pull of the wire in case the connecter should become loosened, and means to secure the connecter means to some other structure.

23. A wire connecter device for hollow wire comprising connecter means having an internal conical surface, the internal conical surface having its smaller diameter spaced from the end of the wire, a contractile sleeve adapted to fit over the wire and having an exterior conical surface engaging the internal conical surface of the connecter means, the contractile sleeve having its smaller end spaced from the end of the wire and its larger end adjacent the end of the wire to provide for retightening thereof, said contractile sleeve adapted to be initially contracted to grip the wire by enforcing relative movement between the contractile sleeve and the internal conical surface; a radial shoulder on the contractile sleeve spaced from its smaller end, plug means insertable within the wire and freely movable therewith and with the contractile sleeve to assist in retightening of the latter, means carried by the plug means and engaging the radial shoulder to move the contractile sleeve with the plug means and wire, and means to secure the connecter means to some other structure.

24. A wire connecter device for hollow wire comprising connecter means having an internal conical surface, the internal conical surface having its smaller diameter spaced from the end of the wire, a contractile sleeve adapted to fit over the wire and having an exterior conical surface engaging the internal conical surface of the connecter means, the contractile sleeve having its smaller end spaced from the end of the wire and its larger end adjacent the end of the wire to provide for retightening thereof, said contractile sleeve being initially contracted to grip the wire by enforcing relative movement between the contractile sleeve and the internal conical surface; a radial shoulder carried by the contractile sleeve spaced from the smaller end of the latter; plug means insertable within the wire and freely movable therewith and with the contractile sleeve to assist in retightening of the latter including, a radially extending flange carried by the plug means and engaging the axial shoulder, and means to secure the connecter means to some other structure.

25. A wire connecter device for hollow wire comprising connecter means having an internal conical surface, the internal conical surface having its smaller diameter spaced from the end of the wire, a contractile sleeve adapted to fit over the wire and having an exterior conical surface engaging the internal conical surface of the connecter means, the contractile sleeve having its smaller end spaced from the end of the wire and its larger end adjacent the end of the wire to provide for retightening thereof, means to initially contract the contractile sleeve to grip the wire by enforcing relative movement between the contractile sleeve and the internal conical surface, a radially extending shoulder on the contractile sleeve spaced from its smaller end, plug means insertable within the wire and freely movable therewith and with the contractile sleeve to assist in retightening of the latter, means carried by the plug means and engaging the radial shoulder to move the contractile sleeve with the plug means and wire, and means carried by the connecter means to secure the connecter to some other structure.

26. A self-tightening wire connecter for connecting the end of a hollow wire comprising a body member, a connecter sleeve having an internal conical surface the smaller diameter of which is spaced from and the larger diameter of which is located adjacent to the end of the wire, a contractile sleeve adapted to fit over the wire and having an external conical surface engaging the inner conical surface of the connecter sleeve with its smaller end spaced from and its larger end located adjacent to the end of the wire, a plug insertable within the end of the wire, means carried by the plug and engaging the contractile sleeve to move the latter axially for tightening the same against the wire and plug by a pull on said wire, and means to secure the connecter sleeve in fixed relation to said body member.

27. A self-tightening wire connecter for connecting the end of a hollow wire comprising a connecter sleeve having an internal conical surface the smaller diameter of which is spaced from and the larger diameter of which is located adjacent to the end of the wire, a contractile sleeve adapted to fit over the wire and having an external conical surface engaging the inner conical surface of the connecter sleeve with its smaller end spaced from and its larger end located adjacent to the end of the wire, a plug insertable within the end of the wire, means carried by the plug and the contractile sleeve cooperating together to move the latter axially for tightening the same against the wire and plug by a pull on said wire, and means to secure the connecter sleeve to some other structure.

28. A self-tightening wire connecter for connecting the end of a hollow wire comprising a connecter sleeve having an internal conical surface the smaller diameter of which is spaced from and the larger diameter of which is located adjacent to the end of the wire, a contractile sleeve adapted to fit over the wire and having an external conical surface engaging the inner conical surface of the connecter sleeve with its smaller end spaced from and its larger end located adjacent to the end of the wire, a plug insertable within the end of the wire, means carried by the plug and the contractile sleeve cooperating together to move the latter axially for tightening the same against the wire and plug by a pull on said wire, means to initially contract the contractile sleeve, and means to secure the connecter sleeve to some other structure.

STEPHEN N. BUCHANAN.